A. SEARLS.
Whip Socket.

No. 9,297. Reissued July 13, 1880.

Witnesses:
Henry Eichling
M. F. Clifton

Inventor:
Arson Searls
per. J. P. Fuck
his atty

N. PETERS PHOTO-LITHOGRAPHER, WASHINGTON, D. C.

UNITED STATES PATENT OFFICE.

ANSON SEARLS, OF NEWARK, NEW JERSEY.

WHIP-SOCKET.

SPECIFICATION forming part of Reissued Letters Patent No. 9,297, dated July 13, 1880.

Original No. 150,195, dated April 28, 1874. Application for reissue filed March 2, 1880.

*To all whom it may concern:*

Be it known that I, ANSON SEARLS, of the city of Newark, county of Essex, State of New Jersey, have invented an Improvement in Whip-Sockets, of which the following is a specification, reference being had to the accompanying drawings, forming part of the same, of which—

Figure 1:
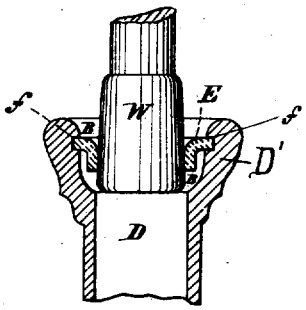
Figure 2:
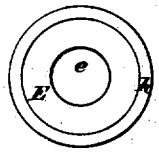

Figure 1 is a longitudinal central section of the upper end of a whip-socket containing my improvement, and showing the butt-end of a whip-stock in the act of being introduced into the socket, and Fig. 2 is a top or face view of the perforated rubber disk or diaphragm, particularly described hereinafter.

My invention relates to that class of whip-sockets that are provided with an elastic expansible ring or perforated disk near their upper open ends, that serves the purpose of holding the whip-stock upright in the socket and prevents its wabbling; and it consists in the combination, with the socket, of a plain, flat, elastic expansible ring or diaphragm held loosely in an annular groove near the upper open end of the socket only by the elastic expansive force of the ring itself, and without rims, spurs, thick rims on its edge, compression, or other analogous appliance.

D represents the barrel or body, and D′ the top part, of a whip-socket, the said body and top being preferably made entirely of one piece, of wood or any suitable material.

In and near the upper open end an annular groove, *f*, is formed for receiving the perimeter of the flat, plain, elastic expansible ring or perforated diaphragm.

E is such a ring or diaphragm, made of rubber. This ring is sufficiently thick to possess the requisite stiffness to hold the whip securely in an upright position in the socket and sufficient elastic expansive force to maintain its place in its groove by such force alone, so that it will not be pulled entirely out by the insertion or withdrawal of the whip, while it is held loosely in the groove. The said ring is plain and flat, and the central opening, *e*, is of suitable size to admit the whip-stock. In diameter the ring is large enough to fill the groove *f*, which is made sufficiently wide between the walls to permit the ring to lie loosely in it without being pinched or clamped between them.

The top of the socket is made preferably bell-shaped, as shown, forming an enlargement, B, above the barrel D, thus affording space for the flexure of the inner or central portion of the ring up and down, on the withdrawal and insertion of the whip.

The butt W of a whip-stock, which may be of any size, from the smallest ordinarily used up to the size of the barrel D, inserted through the disk E, expands the disk outward and forces the center downward and outward toward or against the wall of the top B, until the whip passes freely through it into the barrel D.

The operation of withdrawing the whip expands the ring E and pulls it upward and outward in the same way without pulling it entirely out of the groove.

It will be observed that the ring E is loose in the groove *f*, and is not held by rims, spurs, thick rims on the edge, compression, or any appliance whatsoever heretofore in use for the purpose, yet as the passing of the whip-stock through it will not withdraw the ring entirely from the groove, as soon as the whip leaves the ring the ring resumes its normal shape and position, pushing itself back into the groove by its own elastic expansive force, it having sufficient substance, stiffness, and resistance to pressure to insure this result.

When the rubber is held by being clamped between the walls of the groove, or by spurs, pins, or any equivalent device, it is liable to be torn from its fastenings and pulled partially out, when the whip is inserted or withdrawn, and when so pulled out it will remain out, as the elastic force of the rubber is not sufficient to carry it back against the resistance of the clamping or the obstruction of the spurs or pins.

By making a plain flat ring sufficiently thick to possess the requisite elastic expansive force, and placing it loosely in the groove in the socket, it may be readily inserted and removed at pleasure. It is not liable to be either pulled out, torn, or injured by the insertion or withdrawal of the whip, and the central part of the ring may yet have sufficient thickness and stiffness to securely hold the whip upright and prevent it from wabbling against the hard wall of the socket, whereby it is liable to be chafed and injured.

By making the perimeter *h* of the disk or ring E of harder rubber than the center, which may be readily done in the vulcanization of the rubber, its efficiency is increased.

What I claim as new, and desire to secure by Letters Patent, is—

1. A whip-socket the body and top of which are formed of one piece, and having a groove, *f*, formed therein near the upper end, in which is inserted the rubber disk E, as and for the purpose described.

2. In combination with a whip-socket, a plain perforated rubber disk, E, held loosely in a groove in the socket by its own elastic expansive force, substantially as described.

3. The combination, with a whip-socket, of the rubber disk E, as described, the perimeter *h* being of harder rubber than the other part of said disk, as specified.

ANSON SEARLS.

Witnesses:
M. F. CLIFTON,
A. S. FITCH.